United States Patent
Kakumaru et al.

(10) Patent No.: US 7,522,564 B2
(45) Date of Patent: Apr. 21, 2009

(54) RADIO TERMINAL AND RADIO COMMUNICATION SYSTEM USING SAME

(75) Inventors: Takahiro Kakumaru, Tokyo (JP); Shinichi Morimoto, Tokyo (JP)

(73) Assignee: NEC Corporation (JP)

( * ) Notice: Subject to any disclaimer, the term of this patent is extended or adjusted under 35 U.S.C. 154(b) by 819 days.

(21) Appl. No.: 10/677,585

(22) Filed: Oct. 2, 2003

(65) Prior Publication Data

US 2004/0072559 A1   Apr. 15, 2004

(30) Foreign Application Priority Data

Oct. 3, 2002   (JP)   ............... 2002-291063

(51) Int. Cl.
*H04W 4/00* (2006.01)
*H04L 12/413* (2006.01)

(52) U.S. Cl. ..................... 370/338; 370/448

(58) Field of Classification Search ........... 370/311, 370/338, 346, 445, 447, 448; 455/574, 343.2, 455/343.4
See application file for complete search history.

(56) References Cited

U.S. PATENT DOCUMENTS

| | | | | |
|---|---|---|---|---|
| 6,119,024 | A * | 9/2000 | Takayama | 455/574 |
| 6,567,384 | B1 * | 5/2003 | Shimbo | 370/311 |
| 2003/0117968 | A1 * | 6/2003 | Motegi et al. | 370/311 |
| 2003/0186724 | A1 * | 10/2003 | Tsutsumi et al. | 455/561 |
| 2004/0165574 | A1 * | 8/2004 | Kakumaru et al. | 370/349 |

FOREIGN PATENT DOCUMENTS

| | | |
|---|---|---|
| JP | 7-326998 | 12/1995 |
| JP | 9-83427 | 3/1997 |
| JP | 09-083427 * | 3/1997 |
| JP | 9-162798 | 6/1997 |
| JP | 10-190560 | 7/1998 |
| JP | 10-209993 | 8/1998 |
| JP | 10-210053 | 8/1998 |
| JP | 2000-253017 | 9/2000 |
| JP | 2001-345748 | 12/2001 |
| JP | 2001-345752 | 12/2001 |
| JP | 2002-7002 | 1/2002 |
| JP | 2003-348095 | 12/2003 |

OTHER PUBLICATIONS

Office Action issued by the Japanese Patent Office on Nov. 2, 2004 in the counterpart Japanese patent application with English-language translation thereof.
Part 11: Wireless LAN Medium Access Control (MAC) and Physical Layer (PHY) Specifications, ANSI/IEEE Std 802, 1999 Edition, pp. 128-133.

* cited by examiner

*Primary Examiner*—Nguyen Vo

(57) ABSTRACT

A radio terminal and a radio communication system using the same, which enables power saving, the improvement of the quality of real-time communication such as voice communication, and a reduction of packet delay. An intermittent receiving interval for each radio terminal is set according to the operation mode of each application running on the radio terminal. Consequently, the intermittent receiving interval can be changed in cooperation with the operation mode of each application. Thus, power-saving control for the radio terminal can be carried out precisely. In addition, the radio terminal can assign priorities to data transmitted from the radio base station. The priorities are set according to the operation mode of each application running on the radio terminal, and the packets of real-time communication can be transmitted preferentially.

40 Claims, 11 Drawing Sheets

FIG. 5
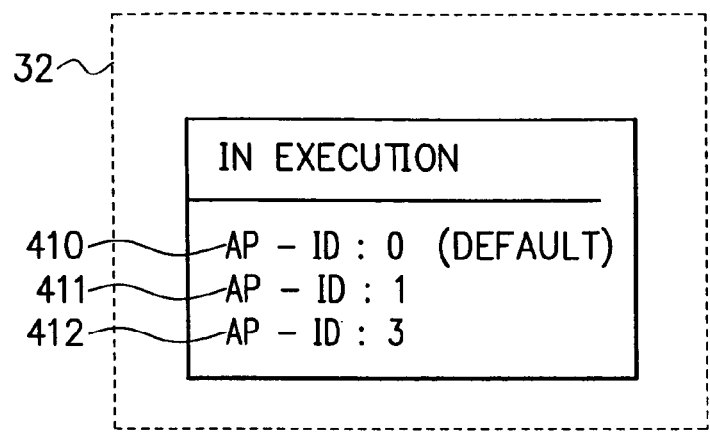
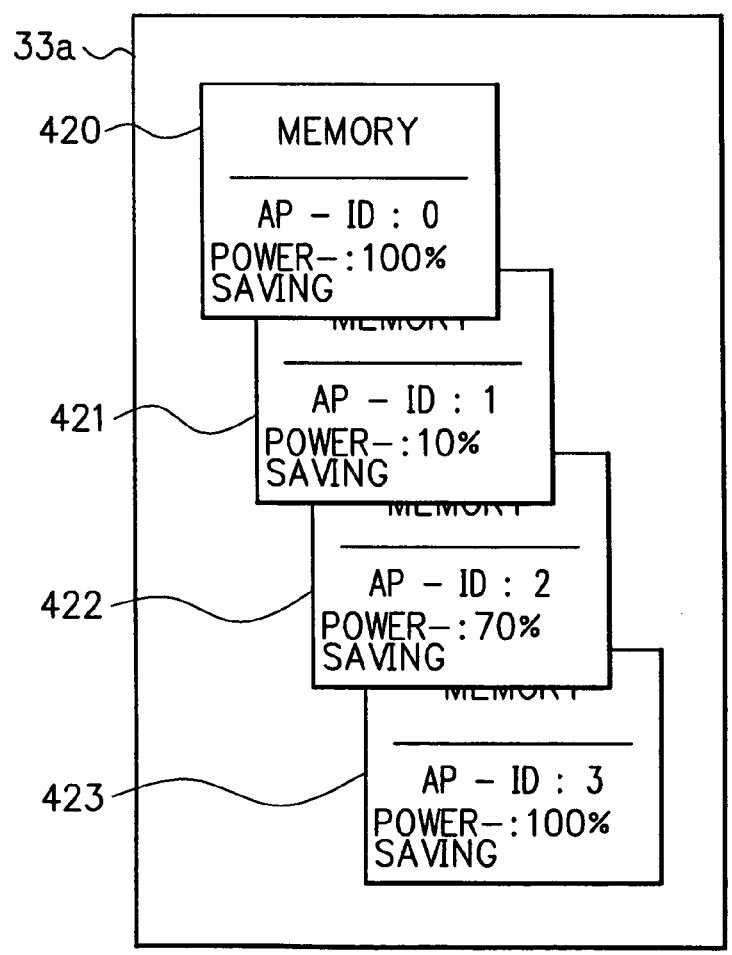

FIG. 7
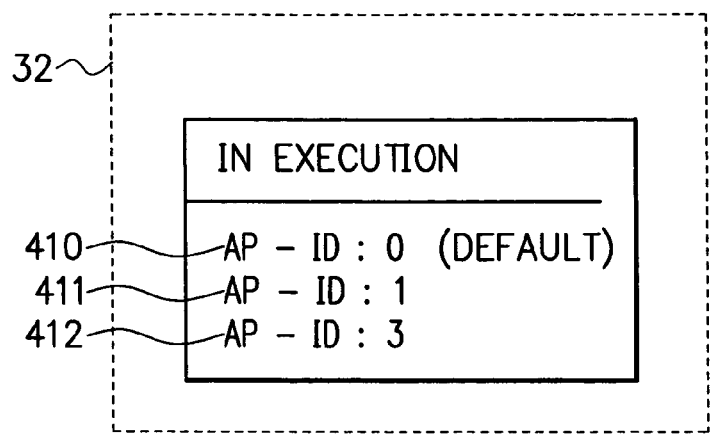
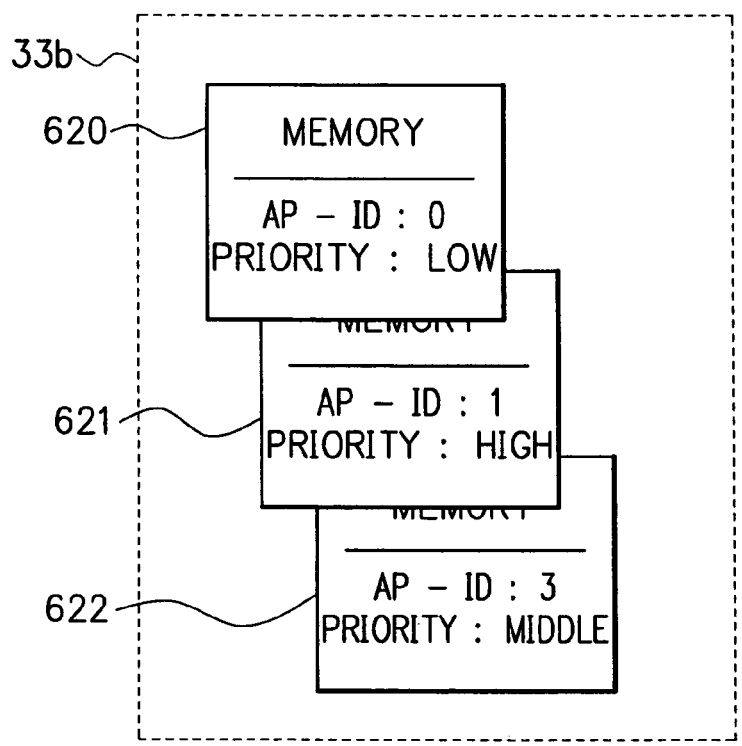
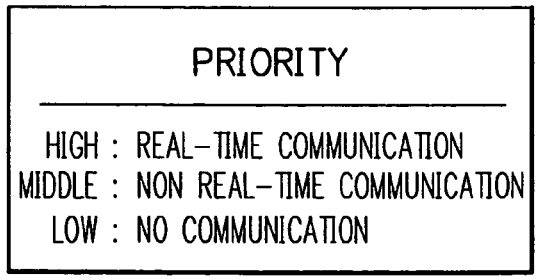

F I G. 10
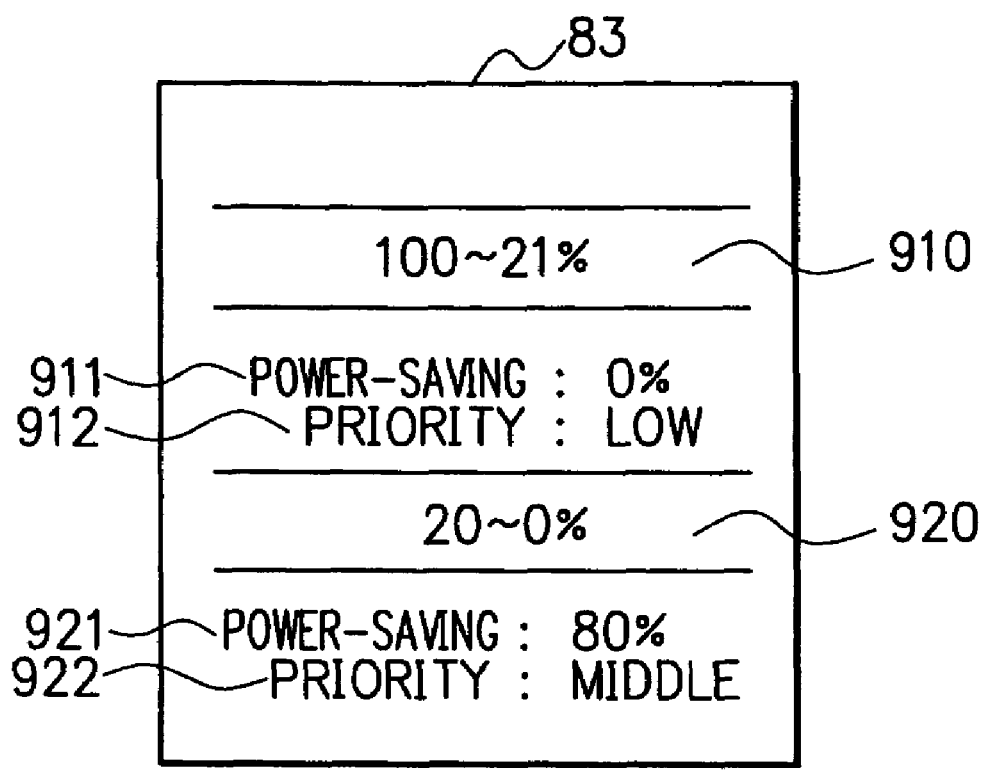

RADIO TERMINAL AND RADIO COMMUNICATION SYSTEM USING SAME

FIELD OF THE INVENTION

The present invention relates to a radio terminal and a radio communication system using the same, and more particularly, to a radio terminal and a radio communication system using the same, which comprises a radio base station connected to a LAN (Local Area Network) or a WAN (Wide Area Network) by radio or wireless, and radio mobile terminals connected to the LAN or WAN through the radio base station by radio.

BACKGROUND OF THE INVENTION

In a conventional radio communication system having power-saving control, for example, in a wireless LAN system described in Japanese Patent Application laid open No. HEI9-162798 (FIGS. 14 to 20) and "Part 11: Wireless LAN Medium Access Control (MAC) and Physical Layer (PHY) Specifications", ANS/IEEE Std 802.11, 1999 Edition, pp. 128-133, the power-saving operation in a radio terminal is carried out by intermittently receiving beacons from a radio base station. That is, when a radio terminal enters power-save mode, the radio terminal obtains a beacon transmitted from a radio base station. Having extracted respective information elements included in the beacon, the radio terminal carries out intermittent receiving operation based on beacon interval information included within the beacon and an interval between beacons each having a delivery traffic indication map (DTIM).

When operating in the power-save mode, a radio terminal informs the radio base station of the operation using a frame control field. The radio base station buffers packets addressed to the radio terminal operating in the power-save mode in a memory within the radio base station, and informs the radio terminal that the packets have been buffered by a traffic indication map (TIM) included in a beacon.

The radio terminal operating in the power-save mode receives beacons intermittently from the radio base station. After receiving each beacon, the radio terminal extracts information elements. Having recognized from the TIM that the packets sent to the radio terminal itself have been buffered, the radio terminal sends the radio base station a control packet (PS-Poll) requesting the delivery the buffered packets, thus receiving its packets buffered by the radio base station.

Additionally, a broadcast/multicast packet is sent to the radio terminal subsequent to a beacon with the DTIM. The radio terminal receives at least a beacon with the DTIM so as to obtain the broadcast/multicast packet.

FIG. 1 is a sequence diagram schematically showing the operation of the conventional wireless LAN system in a continuous receiving mode for the normal operation and the power-save mode for the intermittent receiving operation. Radio terminals 1220 and 1230 belong to a radio base station 1210. The radio terminal 1220 is operating in the normal continuous receiving mode, while the radio terminal 1230 is operating in the power-save mode for carrying out the power-saving operation in a general wireless LAN system.

Since the radio terminal 1220 operating in the continuous receiving mode is always in the power-on or awake state, the radio base station 1210 transmits a packet (P20) without buffering it, the terminal 1220 can receive the packet (P20) without delay. On the other hand, the radio terminal 1230 operating in the power-save mode is controlled as to power-on/power-off in synchronism with the interval between DTIM beacons DB1 and DB2 transmitted from the radio base station 1210. After a packet P10 addressed to the radio terminal 1230 has arrived at the radio base station 1210, the radio terminal 1230 is informed by the next beacon with the DTIM that a packet sent to the terminal 1230 has been buffered. Having recognized from the information that the radio base station 1210 has buffered its packet, the terminal 1230 transmits a PS-Poll packet PS1 to the radio base station 1210, and receives its buffered packet P30 from the base station 1210 in response.

As just described, with the conventional radio communication system in a wireless LAN system, the power-saving operation in a radio terminal is conducted by intermittently receiving beacons from a radio base station. Besides, it is necessary to receive at least a beacon with the DTIM to obtain a broadcast/multicast packet.

Power saving on a radio terminal can be achieved by lengthening the interval between the receiving of beacons from a radio base station if there is no traffic. However, when the receiving interval is lengthened, the radio terminal can be late in obtaining the TIM, which causes a delay in receiving its packets.

In addition, a radio base station buffers packets addressed to a radio terminal operating in the power-save mode in its memory. Consequently, when the receiving interval is lengthened on the radio terminal operating in the power-save mode, delivery of packets to the radio terminal is delayed. Thus, the radio base station has to retain the packets in the memory.

In the real-time communication of voice, moving images, etc., if a radio terminal in the power-save mode operates at long receiving intervals when repeating transmission and reception, packets addressed to the radio terminal are once buffered by a radio base station and delivered thereto in the next receiving period. Accordingly, a packet delay occurs. In the real-time communication of voice and moving images, the delay in receiving packets on the radio terminal is a significant problem because this disrupts the reproducibility of data.

In the wireless LAN communication, the CSMA/CA (Carrier Sense Multiple Access protocol with Collision Avoidance) procedure is performed in order to avoid a collision during data transmission. Regardless of communicating application, the same IFS (Inter Frame Space) is applied to every control packet (PS-Poll) which a radio terminal transmits for requesting a radio base station to send packets when the radio terminal is operating in the power-save mode. Therefore, it is impossible to minimize delays and to give transmission right preferentially to the communication that requires real-time processing such as voice communication.

Moreover, the back off algorithm is used when data are to be transmitted to a radio terminal. That is, data are actually transmitted when random wait time has passed after the transmission right was given. Consequently, it is required to wait the random time regardless of the contents of transmission data, which makes it impossible to minimize delays in real-time communication such as voice communication.

SUMMARY OF THE INVENTION

It is therefore an object of the present invention to provide a radio terminal and a radio communication system using the same, in which the intermittent receiving interval for the purpose of power-saving with respect to each radio terminal can be changed according to the operation mode of the application, and priorities are assigned to data transmitted from the radio base station to the radio terminal in response to polling data according to the operation mode of the application, thus enabling power-saving, the improvement of the quality of real-time communication such as voice communication, and a reduction of packet delay.

In accordance with the first aspect of the present invention, to achieve the above object, there is provided a radio terminal which intermittently receives beacons transmitted from a radio base station at regular intervals and beacons each having a delivery traffic indication map transmitted from the radio base station at intervals of certain beacon intervals, in which, having recognized that its packets are buffered in the radio base station by extracting information elements included in a received beacon, the radio terminal sends the radio base station a control packet to request delivery of the packets, thereby receiving the packets buffered in the radio base station, including a timer value changing section for dynamically changing one or more timer values according to the operation mode of each communication application running on the radio terminal.

With this construction, the timer value(s) can be dynamically changed depending on the communication applications in execution. Therefore, even when there is any communication application being in communication, electric power consumption can be reduced as much as possible.

In accordance with the second aspect of the present invention, there is provided a radio terminal which intermittently receives beacons transmitted from a radio base station at regular intervals and beacons each having a delivery traffic indication map transmitted from the radio base station at intervals of certain beacon intervals, in which, having recognized that its packets are buffered in the radio base station by extracting information elements included in a received beacon, the radio terminal sends the radio base station a control packet to request delivery of the packets, thereby receiving the packets buffered in the radio base station, comprising: a plurality of communication applications, one or more parameters being set individually for each of them; a computing section for carrying out aggregative computations to obtain a timer value(s) based on the parameters set for two or more communication applications in execution among the plural communication applications; and a setting section for setting the timer value(s) obtained by the computing section.

With this construction, the intermittent receiving interval with respect to each radio terminal that performs the intermittent receiving operation can be freely changed by the setting on the radio terminal side only regardless of the radio base station based on the timer values obtained through the aggregative computations of the parameters set for two or more communication applications. Therefore, in the case where a plurality of radio terminals are connected to one radio base station, the respective radio terminals can perform the intermittent receiving operation at different intermittent receiving intervals.

In accordance with the third aspect of the present invention, in the first or second aspect, the timer value is an interval selected from divisors of the interval between the beacons each having the delivery traffic indication map within the range of the regular interval between beacons to the interval between beacons each including the delivery traffic indication map.

With this construction, in most cases, the radio terminal that performs the intermittent receiving operation can become aware that its packets are buffered in the radio base station sooner as compared to the radio terminal that operates in normal intermittent receiving mode in synchronism with a beacon with the delivery traffic indication map since the radio terminal performs the intermittent receiving operation at shorter time intervals.

In accordance with the fourth aspect of the present invention, in the first or second aspect, an inter frame space (IFS) timer value which forms a basis for detecting a change of a channel from the busy state to the idle state at the time of transmission and a random back off time range which is the range of standby time to wait a random period of time before transmission from when the channel goes into the idle state are used as the timer values, and the IFS timer value and the random back off time range are changed according to the start of the operation of the communication application.

With this construction, priorities are assigned to the respective communication applications, and it is possible to set the timer values according to the communication applications being in communication. Consequently, the radio terminal can receive packets sooner as compared to a conventional radio terminal.

In accordance with the fifth aspect of the present invention, in the second aspect, the computing section outputs the minimum value of the respective parameters set for two or more communication applications in execution, and the timer value is obtained based on the minimum value.

In accordance with the sixth aspect of the present invention, in one of the second to fifth aspects, the radio terminal further comprises: a battery charge detector for detecting the remaining amount of charge in a battery that supplies power necessary for the operation of the radio terminal; a parameter limit memory for storing parameter limits set according to the proportions of remaining battery charge in advance; and a comparator that fetches the parameter limits from the parameter limit memory based on the remaining amount of battery charge detected by the battery charge detector, compares the respective parameter values determined by the computing section with the parameter limits obtained from the parameter limit memory, and based on the result of the comparison, selects the determined parameter value or the parameter limit; and the setting section sets the timer value obtained based on the value selected by the comparator.

In accordance with the seventh aspect of the present invention, in the sixth or second aspect, the comparator selects the determined parameter value when the determined parameter value is equal to or larger than the parameter limit, and selects the parameter limit when the determined parameter value is smaller than the parameter limit.

In accordance with the eighth aspect of the present invention, in the seventh aspect, the parameter limit value stored in the parameter limit memory is set based on remaining battery charge, and when remaining battery charge has reduced to less than a certain value, the intermittent receiving interval becomes longer than that when remaining battery charge is more than the certain value.

With this construction, it becomes possible to control the operation of the radio terminal so as to prolong the battery life as long as possible when remaining battery charge has reduced.

In accordance with the ninth aspect of the present invention, in the seventh aspect, the parameter limit value stored in the parameter limit memory is set based on remaining battery charge, and when remaining battery charge has reduced to less than a certain value, the inter frame space (IFS) timer value becomes larger and the random back off time range becomes narrower than those when remaining battery charge is more than the certain value.

With this construction, a communication application is not abruptly interrupted during communication since its priority is increased when remaining battery charge has reduced.

Besides, it is possible to reduce wait time since packets can be transmitted preferentially, which reduces electric power consumption.

In accordance with the tenth aspect of the present invention, there is provided a radio communication system using the radio terminal claimed in claims 1 to 9, comprising: a radio base station which intermittently transmits beacons at regular intervals and beacons each having a delivery traffic indication map at intervals of certain beacon intervals, and once buffers packets to the radio base station(s) operating in power-save mode after the completion of negotiations in a memory; and one or more radio terminals each of which intermittently receives beacons transmitted from a radio base station, and, when recognizing that its packets are buffered in the radio base station by extracting information elements included in a received beacon, sends the radio base station a control packet to request delivery of the packets, thereby receiving the packets buffered in the memory of the radio base station.

BRIEF DESCRIPTION OF THE DRAWINGS

The objects and features of the present invention will become more apparent from the consideration of the following detailed description taken in conjunction with the accompanying drawings in which:

FIG. 5 is a diagram illustrating examples of the contents of the communicating application memory and parameter memory depicted in FIG. 4;

FIG. 7 is a diagram illustrating other examples of the contents of the communicating application memory and parameter memory depicted in FIG. 4;

FIG. 10 is a diagram illustrating an example of the contents of the parameter memory depicted in FIG. 9.

DESCRIPTION OF THE PREFERRED EMBODIMENTS

Figure 1:
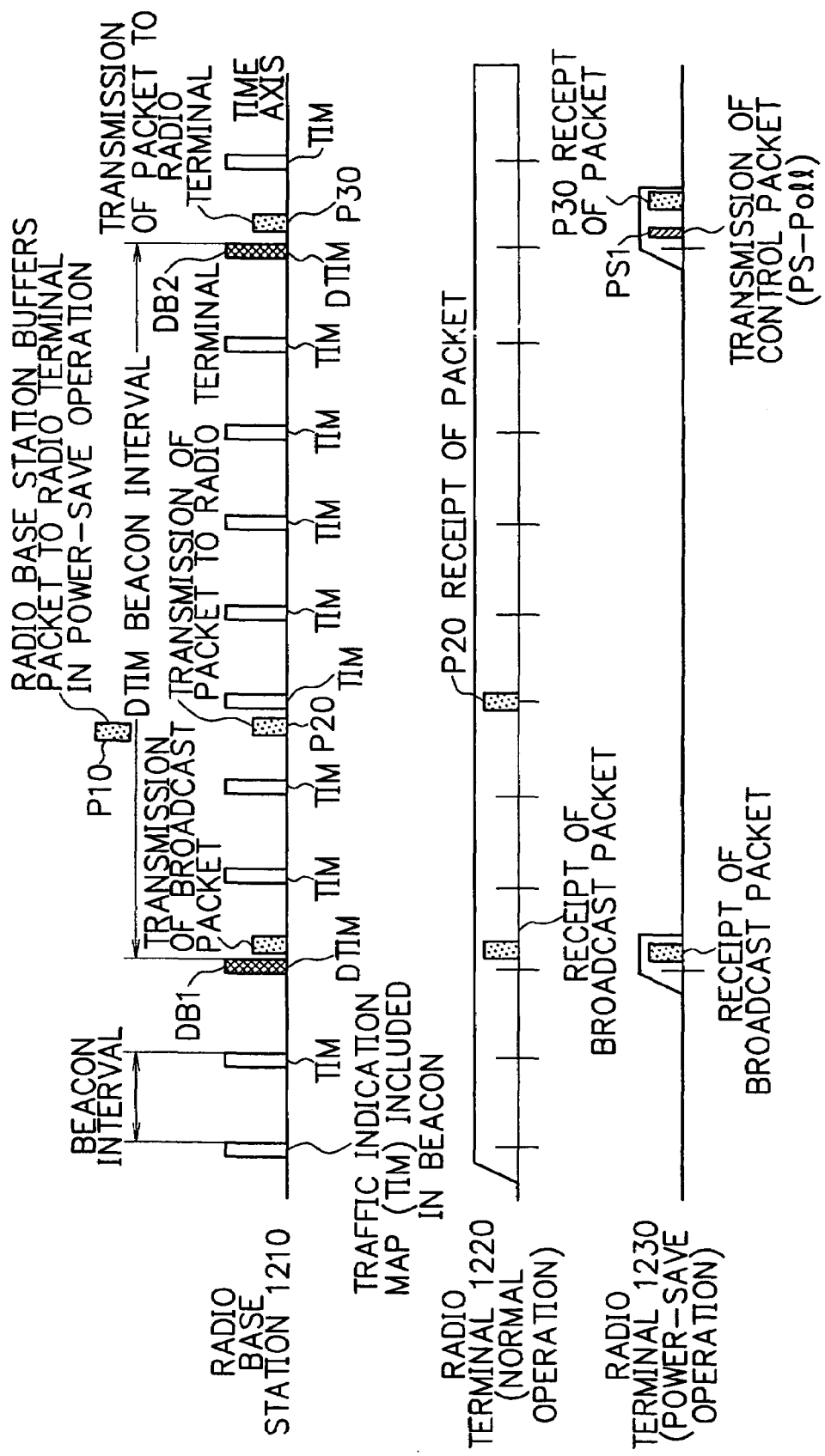
FIG. 1 is a sequence diagram schematically showing the operation of a conventional radio communication system.

Referring now to the drawings, a description of preferred embodiments of the present invention will be given in detail.

Figure 2:
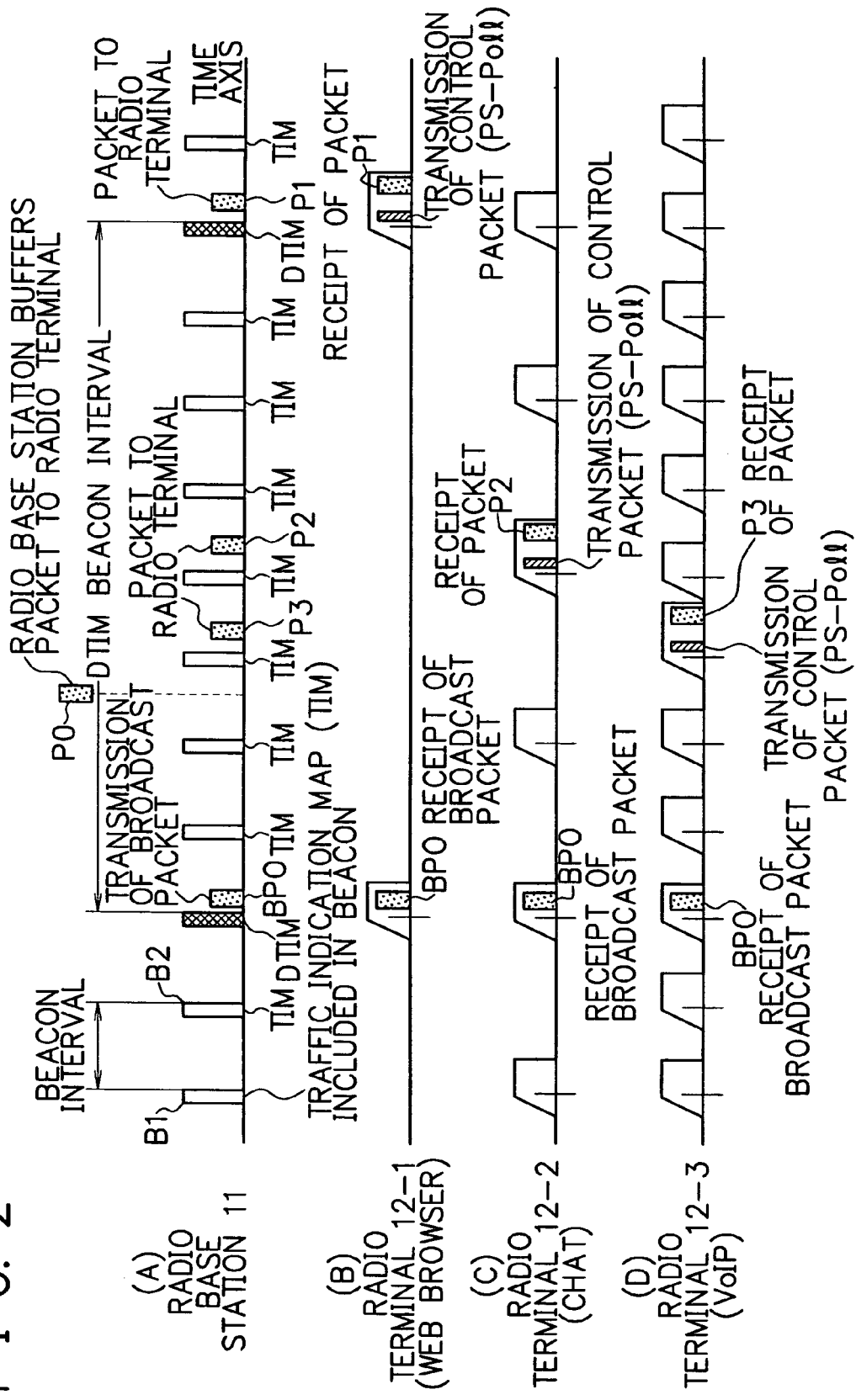
FIG. 2 is a sequence diagram schematically showing the operation of a radio communication system of the present invention.

FIG. 2 is a sequence diagram schematically showing the operation of a radio communication system of the present invention. More specifically, FIG. 2 is a time chart indicating the operation of a radio communication system, which comprises a radio base station 11 and radio terminals 12-1, 12-2 and 13-3 connected with each other via a LAN or a WAN. The radio terminals 12-1, 12-2 and 12-3 belong to the radio base station 11. The radio base station 11 once buffers packets to the radio terminals that belong to the station 11 and carries out the intermittent receiving operation, and sends the packets to the respective radio terminals on receipt of transmission requests from them.

In the radio communication system of FIG. 2, a "Web browser" application is running on the radio terminal 12-1, a "chat" application is running on the radio terminal 12-2, and a "VoIP" application is running the radio terminal 12-3.

The radio terminals 12-1, 12-2 and 12-3 perform the intermittent receiving operation at different intervals, respectively, in synchronism with multiples of beacons transmitted by the radio base station 11 at a regular time interval. The intermittent receiving interval for each of the radio terminals 12-1, 12-2 and 13-3 is determined according to the operation mode of the application running on each terminal.

The receiving interval is selected from divisors of the interval between DTIM (Delivery Traffic Indication Map) beacons (beacons each containing the DTIM as the TIM (Traffic Indication Map)) within the range of the TIM interval (a fixed interval between beacons each including the TIM) to the DTIM interval (an interval between beacons each including the DTIM). In other words, the shortest intermittent receiving interval is the TIM interval, and the longest receiving interval is the DTIM interval, namely, the TIM interval ×n (n: an arbitrary integer). Accordingly, it becomes possible to change the intermittent receiving interval of each radio terminal depending on the operation mode of the application, and thereby power-saving control for the radio terminal can be executed accurately.

Besides, the radio terminals 12-1, 12-2 and 12-3 can maintain the priorities of packet transmission requests (PS-Poll) transmitted to the radio base station 11. Such priorities are set based on the operation mode of the application running on each of the radio terminals 12-1, 12-2 and 12-3. Consequently, packets of real-time communication such as voice packets can be preferentially transmitted. Thus, it is possible to reduce delay and improve voice quality.

In the following, the operation of the radio communication system of the present invention will be described in detail referring to FIG. 2. Incidentally, it is assumed that the radio terminals 12-1, 12-2 and 12-3 have already concluded negotiations with the radio base station 11, and the base station 11 has been informed that the terminals 12-1, 12-2 and 12-3 are operating in power-save mode.

As shown in FIG. 2(A), the radio base station 11 transmits beacons at regular time intervals, and also transmits DTIM beacons at intervals of certain beacon intervals. After the negotiations, the radio base station 11 once buffers packets addressed to the radio terminals operating in the power-save mode in its memory, and sends the buffered packets to the terminals upon receipt of transmission requests from the respective terminals operating in the power-save mode.

Here, the DTIM interval is set to, for example, "8". On the respective radio terminals 12-1, 12-2 and 12-3, different applications are running. It is assumed that the radio terminal 12-1 is executing the WEB browser and being in communication. When the AP-ID has been set to "3" and the power-saving rate has been set to 100% at an inside parameter memory, which will hereinafter be described, for the communication application, a wake-up timer value is set to "8" by a timer determining section, which will also be described later. Thus, the radio terminal 12-1 performs the receiving operation at an interval of eight TIM intervals.

The radio terminal 12-1 receives a broadcast packet sent from the radio base station 11 in timing indicated by BP0 in FIG. 2(B), and never fails to receive the packet since power is on when receiving the DTIM beacon. As can be seen in FIG. 2(A), when packets to the radio terminal 12-1 are buffered in the memory of the radio base station 11 at the point of P0, the radio terminal 12-1 recognizes that the packets to the terminal 12-1 have been buffered the next time its power is turned on. Subsequently, the radio terminal 12-1 transmits a control packet (PS-Poll) to the radio base station 11 as shown in FIG. 2(B), and receives the packets at the point of P1.

Assuming that the radio terminal 12-2 is executing the chat and being in communication, when the AP-ID has been set to "2" and the power-saving rate has been set to 70% at the parameter memory in the radio terminal 12-2 for the communication application, the wake-up timer value is set to "4" by the timer determining section. Thus, the radio terminal 12-2 performs the receiving operation at an interval of four TIM intervals.

As in the case of the radio terminal 12-1, the radio terminal 12-2 receives a broadcast packet sent from the radio base station 11 in timing indicated by BP0 in FIG. 2(C), and never fails to receive the packet since power is on when receiving the DTIM beacon. When packets to the radio terminal 12-2 are buffered in the memory of the radio base station 11 at the point of P0 shown in FIG. 2(A), the radio terminal 12-2 recognizes that the packets to the terminal 12-2 have been buffered the next time its power is turned on. Subsequently, the radio terminal 12-2 transmits a control packet (PS-Poll) to the radio base station 11, and receives the packets at the point of P2 shown in FIG. 2(C).

Assuming that the radio terminal 12-3 is executing the VoIP and being in communication, when the AP-ID has been set to "1" and the power-saving rate has been set to 10% at the parameter memory in the radio terminal 12-3 for the communication application, the wake-up timer value is set to "1" by the timer determining section. Thus, the radio terminal 12-3 performs the receiving operation at an interval of one TIM interval.

As in the case of the radio terminal 12-1 and 12-2, the radio terminal 12-3 receives a broadcast packet sent from the radio base station 11 in timing indicated by BP0 in FIG. 2(D), and never fails to receive the packet since power is on when receiving the DTIM beacon. When packets to the radio terminal 12-3 are buffered in the memory of the radio base station 11 at the point of P0 shown in FIG. 2(A), the radio terminal 12-3 recognizes that the packets to the terminal 12-3 have been buffered the next time its power is turned on. Subsequently, the radio terminal 12-3 transmits the control packet (PS-Poll) to the radio base station 11, and receives the packets at the point of P3 shown in FIG. 2(D).

In this embodiment, only one application is running on each of the radio terminals 12-1, 12-2 and 12-3. However, in the case where a plurality of communication applications are running on the respective radio terminals, aforementioned intermittent receiving operation is also carried out in cooperation with the operation modes of the applications by the timer determining section. Besides, even when the plural radio terminals 12-1, 12-2 and 12-3 are connected to the same radio base station 11, the terminals 12-1, 12-2 and 12-3 can perform intermittent receiving operation at different receiving intervals, respectively, according to the operation mode(s) of the application(s) running on each radio terminal. Additionally, when the radio terminals transmit packets, the transmission of packets follows the intermittent receiving operation.

Figure 3:
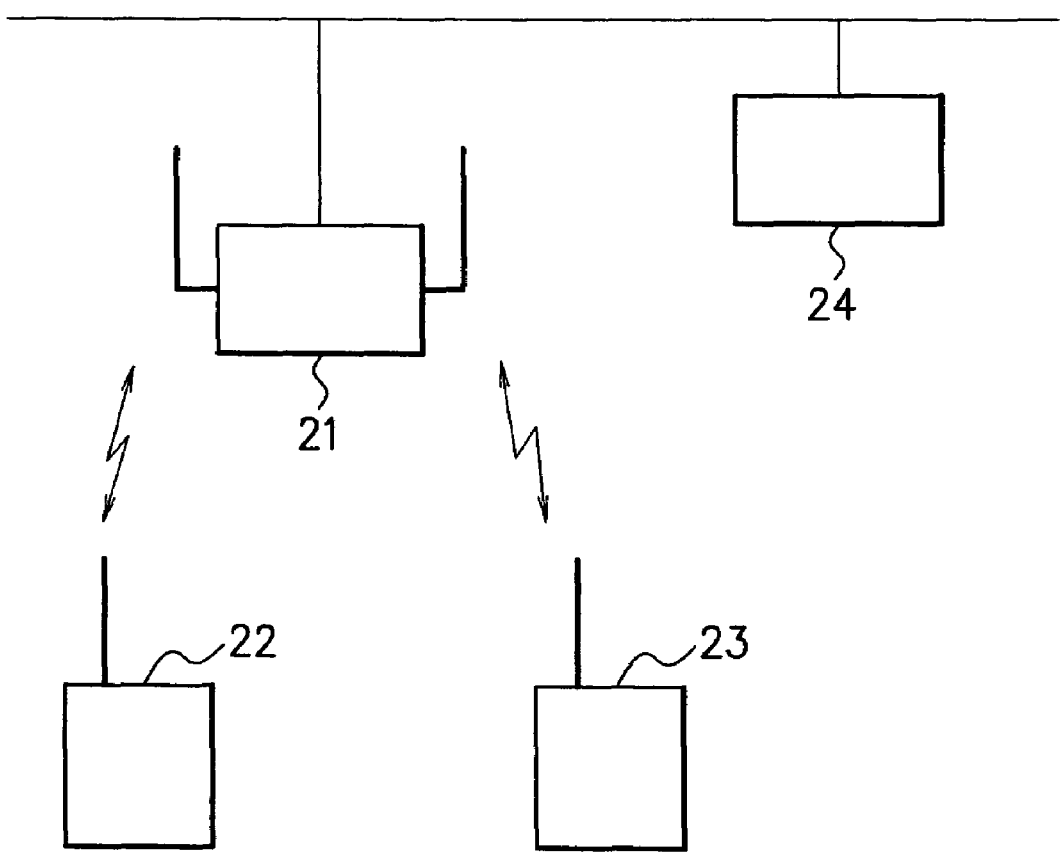
FIG. 3 is a diagram showing the configuration of a radio communication system according to an embodiment of the present invention.

FIG. 3 is a diagram showing the configuration of a radio communication system according to an embodiment of the present invention. Referring to FIG. 3, the radio communication system comprises a radio base station 21, radio terminals 22 and 23 of the present invention, and a terminal unit 24 connected to the radio base station 21 via a LAN or a WAN, and forms a radio or wireless network for the communication of voice, moving images and the like.

After recognizing that each of the radio terminals 22 and 23 enters the power-save mode on receipt of a control packet, the radio base station 21 buffers packets to the terminals 22 and 23 in a memory within the base station 21, and informs the terminals 22 and 23 of the buffered packets by the TIM included in each beacon.

The radio terminals 22 and 23 can communicate with the terminal unit 24 connected to a LAN or a WAN via the radio base station 21 by the internet protocol (IP). The radio terminals 22 and 23 conduct connection negotiations with the radio base station 21 using a wireless physical layer to thereby participate in the network. After the negotiations are concluded, the radio terminals 22 and 23 each receive a beacon from the radio base station 21, and extract respective information elements included in the beacon to obtain the beacon interval. After that, radio terminals 22 and 23 operate in intermittent receiving mode at DTIM intervals.

Figure 4:
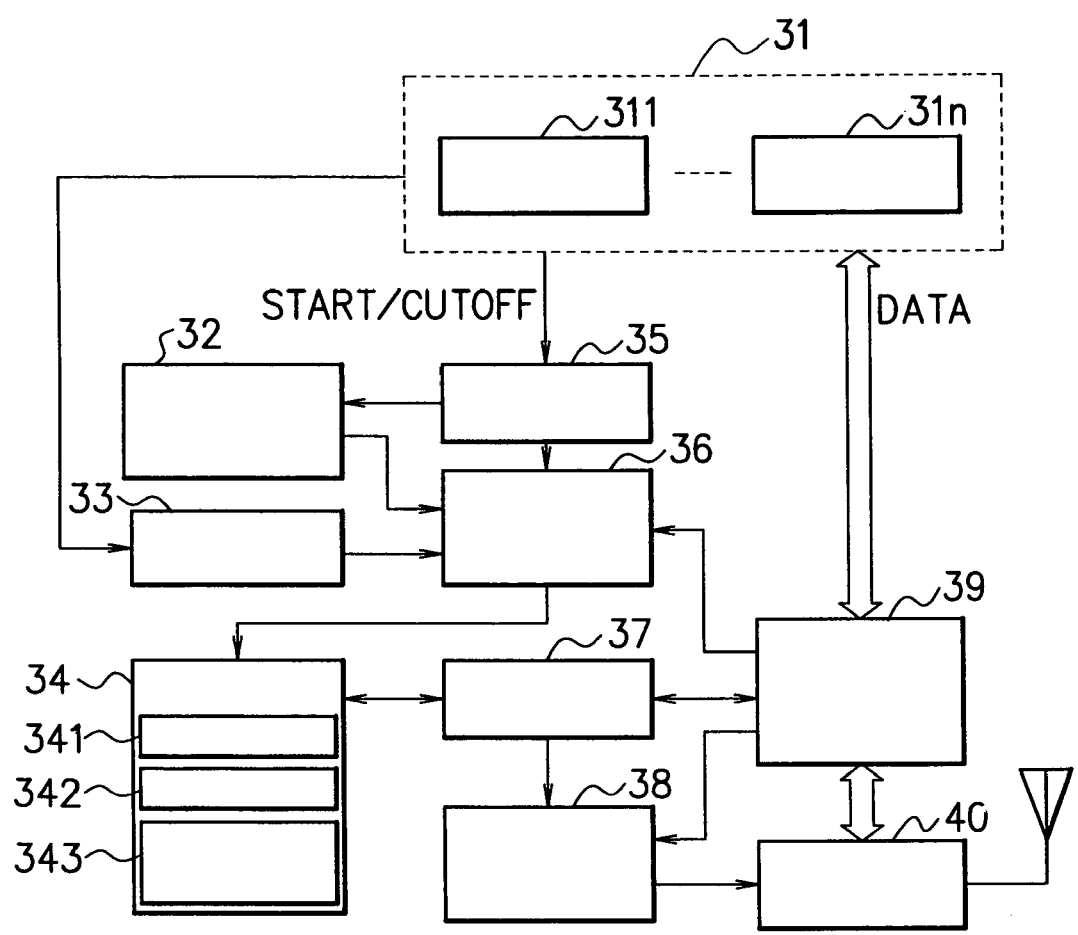
FIG. 4 is a block diagram showing the configuration of a radio terminal according to an embodiment of the present invention.

In the following, a description will be made of the configuration of a radio terminal according to an embodiment of the present invention. FIG. 4 is a block diagram showing the configuration of a radio terminal according to an embodiment of the present invention. Referring to FIG. 4, the radio terminal comprises communication applications 31 (311 to 31$n$), a communicating application memory 32, a parameter memory 33, a timer value memory 34, an application communication management/control section 35, a timer determining section 36, a timer control section 37, a power control section 38, a communication control section 39, and a radio communication interface section 40.

The communication application 31 indicates a communication application running on the radio terminal. While FIG. 4 shows n (n; an integer larger than 1) pieces of communication applications 311 to 31$n$ being active, there may be no active application. When activated, the communication application 31 sets necessary parameters in the parameter memory 33. When deactivated, the communication application 31 deletes the parameters set at the time of its startup from the parameter memory 33. In addition, the communication application 31 informs the application communication management/control section 35 as to the start and cutoff of communication.

The communicating application memory 32 stores applications currently being in communication by values that uniquely identify them. Those values are set by the application communication management/control section 35. With reference to FIG. 5, for example, the communicating application memory 32 stores the values of AP-IDs to identify applications. A value of "zero" (410) is set for the AP-ID to indicate that no communication application is being executed and stored as a default value in advance.

As described above, the communicating application memory 32 stores values corresponding to respective running communication applications. In the case of FIG. 5, the communicating application memory 32 keeps therein that applications with AP-ID values of "1" (411) and "3" (412) are currently communicating.

The parameter memory 33 depicted in FIG. 4 stores the power-saving rate with respect to each running communication application 31. The percentage is set according to the communication application 31. In FIG. 5, the reference character 33a indicates an example of the configuration of the parameter memory 33. When the AP-ID value is "zero" as indicated by the reference numeral 420 in FIG. 5, the power-saving rate is set at 100%, which is previously stored in the parameter memory 33. That is, in the case where no application is activated, the radio terminal of the present invention carries out the intermittent receiving operation at DTIM intervals.

Similarly, when the AP-ID value is "1" as indicated by the reference numeral 421 in FIG. 5, the power-saving rate is set at 10%. When the AP-ID value is "2" as indicated by the reference numeral 422, the power-saving rate is set at 70%. When the AP-ID value is "3" as indicated by the reference numeral 423, the power-saving rate is set at 100%. These percentages are also stored in the parameter memory 33a in advance.

The timer value memory 34 depicted in FIG. 4 is used for timing the intermittent receiving of the radio terminal that conducts the intermittent receiving operation. A wake-up timer value 341 stored in the timer value memory 34 is determined by the timer determining section 36. The timer determining section 36 previously set the wake-up timer value 341 depending on the DTIM interval obtained by receiving a beacon after the completion of negotiations with the radio base station.

The application communication management/control section 35 is informed as to the AP-ID and the start and cutoff of communication by the communication application 31. At the start of communication, the application communication management/control section 35 adds the AP-ID of an application in communication into the communicating application memory 32. On the other hand, when cutting off communication, the application communication management/control section 35 deletes the AP-ID from the communicating application memory 32. In addition, the application communication management/control section 35 informs the timer determining section 36 about a switch in application in communication.

Having been informed about a switch in application in communication by the application communication management/control section 35, the timer determining section 36 obtains the AP-IDs of applications currently in communication from the communicating application memory 32 to recognize the applications in communication. Besides, the timer determining section 36 obtains the power-saving rates for the applications in communication from the parameter memory 33 based on the obtained AP-IDs of the applications. In addition, the timer determining section 36 finds out an intermittent receiving interval for the radio terminal of the present invention according to the minimum power-saving rate of the obtained power-saving rates using the DTIM interval and TIM interval fed by the communication control section 39. After that, the timer determining section 36 sets the intermittent receiving interval as the wake-up timer value 341 stored in the timer value memory 34.

The timer control section 37 obtains the intermittent receiving interval from the wake-up timer value 341, and continues to provide the power control section 38 with the timing at an interval of the TIM intervals corresponding to the wake-up timer value 341. The timer control section 37 starts providing the timing on the basis of the receipt of a beacon with the DTIM. Additionally, the timer control section 37 corrects the timing according to the beacon receiving timing obtained from the communication control section 39.

The power control section 38 repeatedly turns on the power of the radio communication interface section 40 based on the timing fed by the timer control section 37 and turns off the power in response to a cutoff request from the communication control section 39.

The communication control section 39 controls the radio communication interface section 40 to transmit data from the communication application 31 and to feed the application 31 with data received through the interface section 40. The communication control section 39 also controls the negotiations with the radio base station and deals with beacons sent from the radio base station to thereby inform the timer determining section 36 as to the TIM interval and DTIM interval obtained from the beacons. In addition, the communication control section 39 sends a request to cut off the power of the radio communication interface section 40 after receiving beacons or data to the power control section 38.

The radio communication interface section 40 transmits data received from the communication control section 39 by radio. The radio communication interface section 40 also receives data sent by radio from the radio base station, and provides the communication control section 39 with the data. The power of the radio communication interface section 40 is turned on/off by the control of the power control section 38.

In the following, a description will be given in detail of the operation of the radio communication system according to the first embodiment of the present invention with reference to FIGS. 3 to 6.

In FIG. 3, having been activated, the radio terminal 22 conducts negotiations with the radio base station 21. After the negotiations are concluded, no communication application is in operation on the radio terminal 22. On this occasion, since the DTIM interval is set as the wake-up timer value 341 and stored in the timer value memory 34 depicted in FIG. 4 in the radio terminal 22, the terminal 22 performs the intermittent receiving operation at DTIM intervals.

When activated, the parameter memory 33 stores the AP-ID and the power-saving rate for the communication application 31. The AP-ID is uniquely assigned to the communication application 31. For example, in the case where "1" is assigned as the AP-ID to an activated communication application 311, the power-saving rate is set at 10% as indicated by the reference numerals 411 and 421 in FIG. 5.

After that, when the communication application 311 actually enters into communication, the application communication management/control section 35 is informed as to the start of communication. More specifically, the application communication management/control section 35 is informed that, for example, the communication application 311 with the AP-ID "1" has entered into communication. When informed as to the start of communication by the communication application 311, the application communication management/control section 35 determines that communication has been started (FIG. 6, step A51), and adds the informed AP-ID into the communicating application memory 32 as indicated by the reference numeral 411 in FIG. 5 (step A52).

Having added the AP-ID into the communicating application memory 32, the application communication management/control section 35 informs the timer determining section 36 that a switch has been made in communication. When receiving the information about the switch of communication from the application communication management/control section 35, the timer determining section 36 searches the communicating application memory 32 for applications currently being in communication, and obtains the AP-IDs of the applications (step A53).

Next, the timer determining section 36 searches the parameter memory 33 (33a) to fetch all the power-saving rates with respect to the obtained AP-IDs (step A54). When the obtained AP-IDs of the communication applications in execution are "0", "1" and "3", for example, the power-saving rates "100%", "10%" and "100%" are obtained for the AP-IDs "0", "1" and "3", respectively, as indicated by the reference numerals 420, 421 and 423.

Subsequently, the timer determining section 36 determines the power-saving rate by selecting the minimum value from the obtained the power-saving rates (step A55). As just described, when the timer determining section 36 has retrieved a plurality of communication applications in execution (three in the above case), the timer determining section 36 carries out aggregative computations to find out the minimum value of the power-saving rates corresponding to the operation modes of the communication applications. In the above case, since the obtained power-saving rates are 10% and 100%, the timer determining section 36 decides on 10% as the power-saving rate.

After that, the timer determining section 36 finds out the intermittent receiving interval based on the minimum power-saving rate (step A56). As one approach to find out the intermittent receiving interval, the timer determining section 36 takes steps as follows. First, the timer determining section 36 finds out divisors of the DTIM interval. Then, the timer determining section 36 divides the percentage (100%) equally by the number of the divisors, and uses a divisor corresponding to the power-saving rate as the intermittent receiving interval. For example, if the DTIM interval is "8", there are four divisors, "1", "2", "4" and "8". When divided equally among the divisors, the percentage (100%) is divided into four parts, that is, from 0% to 25% for "1", from 26% to 50% for "2", from 51% to 75% for "4" and from 76% to 100% for "8".

Accordingly, the timer determining section 36 decides on "1" as the intermittent receiving interval at step A56 since the section 36 has decided on 10% as the power-saving rate at step A55. The timer determining section 36 stores the decided intermittent receiving interval in the timer value memory 34 as the wake-up timer value 341 (step A57). The timer control section 37 always multiplies the TIM interval based on the wake-up timer value 341 stored in the timer value memory 34, and provides the power control section 38 with the timing on the basis of the product. Consequently, when the wake-up timer value 341 changes due to the start of the operation of a communication application, the intermittent receiving interval for the radio terminal also changes. In other words, in the first embodiment, the wake-up timer value is determined based on the minimum power-saving rate, and thereby the shortest intermittent receiving interval is selected.

On the other hand, when the established communication of an application is cut off, the communication application 311 informs the application communication management/control section 35 as to the cutoff of communication. Having received the information about the cutoff of communication from the communication application 311, the application communication management/control section 35 determines that communication has been cut off (step A51), and deletes the AP-ID corresponding to the informed AP-ID from the communicating application memory 32 (step A58).

After deleting the corresponding AP-ID from the communicating application memory 32, the application communication management/control section 35 informs the timer determining section 36 that a switch has been made in communication. After that, the operation proceeds to the aforementioned step A53, and the process of steps A53 to A57 is performed.

In the case where the application communication management/control section 35 deletes all the AP-IDs of applications that have been in communication from the communicating application memory 32 at step A58, only the AP-ID "0" given as a default value remains behind. Thus, when there is no application being in communication, the radio terminal carries out the intermittent receiving operation at DTIM intervals.

As is described above, according to the first embodiment of the present invention, the intermittent receiving interval can be dynamically changed depending on applications being in communication. Therefore, even when there is any application being in communication, electric power consumption can be reduced as much as possible. Moreover, in the case where a plurality of radio terminals are connected to one radio base station, the intermittent receiving interval with respect to each radio terminal that performs the intermittent receiving operation can be freely changed by the setting on the radio terminal side only regardless of the radio base station. Thus, the respective radio terminals can perform the intermittent receiving operation at different intermittent receiving intervals.

Furthermore, according to the first embodiment of the present invention, there is no need for any special radio base station since the intermittent receiving interval with respect to each radio terminal that performs the intermittent receiving operation can be freely changed by the setting on the radio terminal side only regardless of the radio base station. Consequently, many existing radio base stations are readily available.

Incidentally, while a description has been made of communication between the radio base station 21 and the radio terminal 22, the same is equally true of communication between the radio base station 21 and the radio terminal 23. Further, in the first embodiment, "VoIP", "chat" and "WEB browser" are taken as examples of the communication applications. However, the radio terminal and the radio communication system of the present invention operate in the same manner as previously set forth with any other communication application such as "instant message" and "televisionphone". Still further, in the radio terminal depicted in FIG. 4, while the communication application 31 sets necessary parameters in the parameter memory 33, the parameters may be automatically changed according to the contents of communicated data.

In the following, a description will be made in detail of the second embodiment of the present invention with reference to the drawings.

In the construction of the radio terminal of the second embodiment, the timer value memory 34 stores an IFS timer value 342 and a random back off time range 343 differently from that of the first embodiment. The IFS (Inter Frame Space) timer value 342 is a value used as the basis for detecting a change of a channel from the busy state to the idle state on a wireless LAN at the time of transmission. The random back off time range 343 is the range of standby time to wait a random period of time before transmission from when a channel goes into the idle state.

Besides, the radio terminal of the second embodiment differs from that of the first embodiment in that the parameter memory 33 depicted in FIG. 4 has the construction shown in FIG. 7 (33*b*) instead of the construction shown in FIG. 5 (33*a*). Additionally, the timer determining section 36 depicted in FIG. 4 adopts a different determining method, and the timer control section 37 and the communication control section 39 are provided with new functions.

The parameter memory 33*b* shown in FIG. 7 stores priorities of the communication applications 31 in operation. The priorities are set according to the communication applications 31. For example, "low" priority is assigned to the AP-ID "0", and stored in the parameter memory 33b in advance as indicated by the reference numeral 620 in FIG. 7. In other words, when no application is activated, the radio terminal of the present invention carries out the receiving operation at the level of "low" priority.

Similarly, "high" priority is assigned to the AP-ID "1" as indicated by the reference numeral 621 in FIG. 7, and "middle" priority is assigned to the AP-ID "3" as indicated by the reference numeral 622. These priorities are also stored in the parameter memory 33b in advance.

Incidentally, in the case of "low" priority, the radio terminal has no communication. In the case of "middle" priority, the radio terminal has non real-time communication. In the case of "high" priority, the radio terminal has real-time communication.

The timer value memory 34 depicted in FIG. 4 stores the IFS timer value and the range of random back off time used when the radio terminal transmits the PS-Poll to request the radio base station to send buffered packets.

Having been informed about a switch in application being in communication by the application communication management/control section 35, the timer determining section 36 depicted in FIG. 4 obtains the AP-ID of each application currently being in communication from the communicating application memory 32 to recognize the applications being in communication. Besides, the timer determining section 36 obtains priorities assigned to the applications being in communication from the parameter memory 33, and finds out the highest priority of the obtained priorities. Then, the timer determining section 36 finds out the IFS and the range of random back off time used when the radio terminal of the present invention transmits the PS-Poll based on the highest priority, and stores them in the timer value memory 34 as the IFS timer value 342 and the random back off time range 343.

The timer control section 37 obtains an IFS value and a random back off time value at the time of transmitting the PS-Poll from the IFS timer value 342 and the random back off time range 343, respectively. The timer control section 37 provides the communication control section 39 with the timing based on these values when required by the control section 39 for transmitting the PS-Poll.

The communication control section 39 controls the radio communication interface section 40 to transmit data from the communication application 31 and to feed the application 31 with data received through the interface section 40. In addition, the communication control section 39 receives the IFS value and the random back off time range to thereby transmit the PS-Poll.

Figure 8:
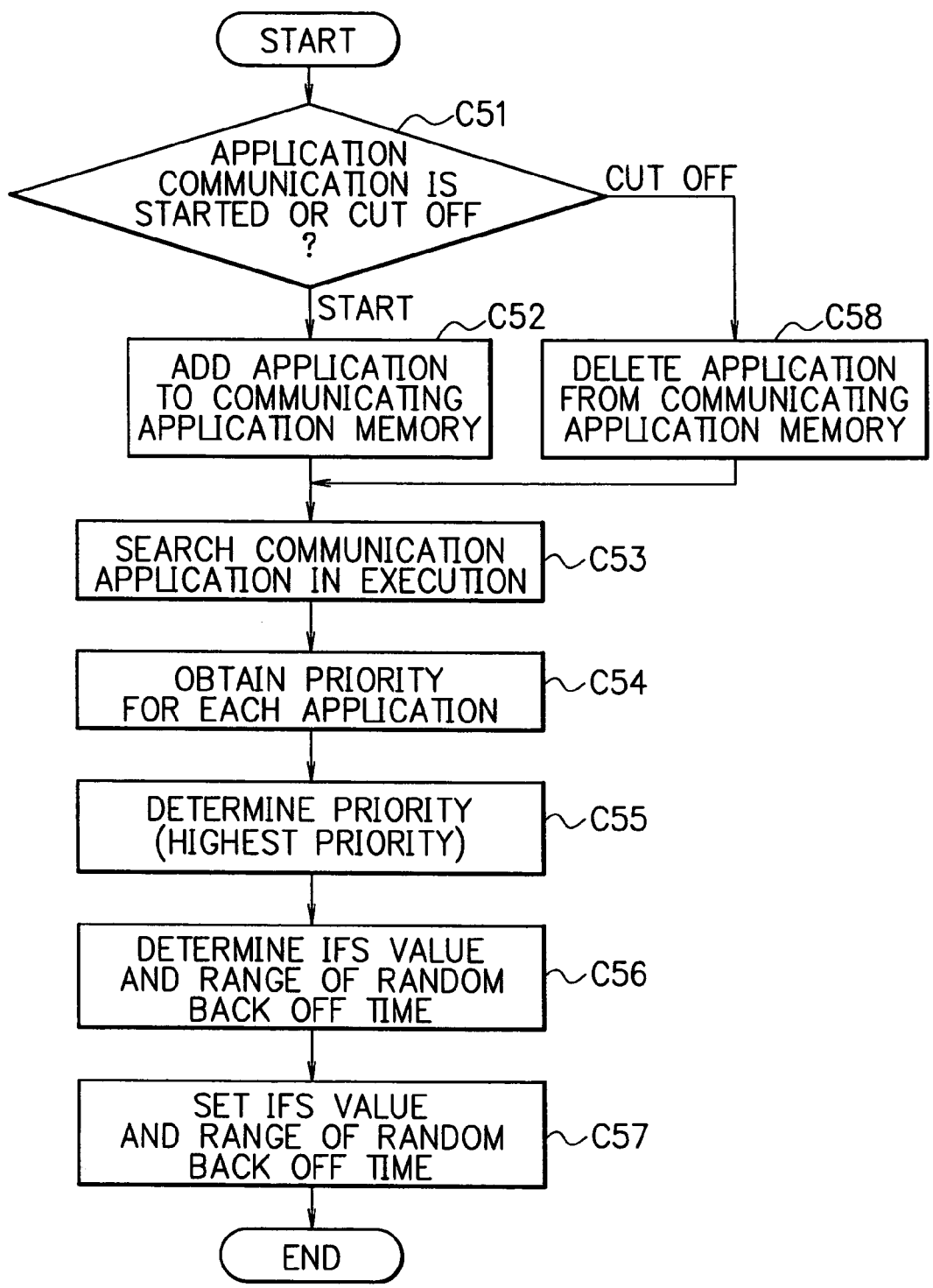
FIG. 8 is a flowchart for explaining the operation of the radio communication system according to the second embodiment of the present invention.

In the following, a description will be given in detail of the operation of the radio communication system according to the second embodiment of the present invention with reference to FIGS. 4, 7 and 8.

In FIG. 4, having been activated, the communication application 311 stores the AP-ID and the priority of communication for the application 311 in the parameter memory 33. The AP-ID is uniquely assigned to the communication application. For example, in the case where "1" is assigned as the AP-ID to the activated communication application 311, "high" priority is assigned to the application 311 and stored in the parameter memory 33 as indicated by the reference numeral 621 in FIG. 7.

After that, when the communication application 311 enters into communication, the application communication management/control section 35 is informed as to the start of communication. More specifically, the application communication management/control section 35 is informed that, for example, the communication application 311 with the AP-ID "1" has entered into communication. When informed as to the start of communication by the communication application 311, the application communication management/control section 35 determines that communication has been started (FIG. 8, step C51), and adds the informed AP-ID into the communicating application memory 32 as indicated by the reference numeral 411 in FIG. 7 (step C52). This adding process is preformed in the same manner as described previously for the first embodiment in connection with FIG. 6.

Having added the AP-ID into the communicating application memory 32, the application communication management/control section 35 informs the timer determining section 36 that a switch has been made in communication. When receiving the information about the switch of communication from the application communication management/control section 35, the timer determining section 36 searches the communicating application memory 32 for applications currently being in communication, and obtains the AP-IDs of the applications (step C53).

Next, the timer determining section 36 searches the parameter memory 33b to fetch priority with respect to each of the obtained AP-IDs (step C54). When the obtained AP-IDs of the communication applications are "0", "1" and "3", for example, "low", "high" and "middle" priorities are obtained for the AP-IDs "0", "1" and "3", respectively, as indicated by the reference numerals 620 to 622.

Subsequently, the timer determining section 36 establishes priority by selecting the highest priority from the obtained priorities (step C55). As just described, when the timer determining section 36 has retrieved a plurality of communication applications in execution (three in the above case), the timer determining section 36 carries out aggregative computations to find out the highest priority of the priorities corresponding to the operation modes of the communication applications. In the above case, since the obtained priorities are "high", "middle" and "low", the timer determining section 36 decides on "high" as the priority.

After that, the timer determining section 36 determines the IFS and the range of random back off time used when the radio terminal actually transmits the PS-Poll based on the decided "high" priority (step C56). As one approach to find out the IFS and the range of random back off time, the timer determining section 36 takes steps as follows. First, the timer determining section 36 sets the IFS timer value using DIFS (Distributed Inter Frame Space). For example, in the case of "high" priority, the timer determining section 36 sets the IFS timer value to DIFS-2t. In the case of "middle" priority, the IFS timer value is set to DIFS-t. In the case of "low" priority, the IFS timer value is set to DIFS (t: arbitrarily value).

On the other hand, assuming that the maximal value of normal random back off time is R, the timer determining section 36 sets the random back off time range to 0 to 0.5R in the case of "high" priority. In the case of "middle" priority, the random back off time range is set to 0 to 0.75R. In the case of "low" priority, the random back off time range is set to 0 to R. Accordingly, the timer determining section 36 decides on "DIFS-2t" as the IFS timer value and the narrowest "0 to 0.5R" as the random back off time range at step C56 since the section 36 has decided on "high" as the priority at step A55.

The IFS timer value and the random back off time range determined as just described are set as the IFS timer value 342 and the random back off time range 343 and stored in the timer value memory 34 (step C57). The timer control section 37 provides the power control section 38 with the timing through the communication control section 39 on the basis of the IFS timer value 342 and the random back off time range 343. Consequently, when the IFS timer value 342 and the random back off time range 343 change due to the start of the operation of a communication application, the IFS and the range of random back off time used when the radio terminal transmits the PS-Poll also change.

On the other hand, when the established communication of the communication application 311 is cut off, the communication application 311 informs the application communication management/control section 35 as to the cutoff of communication. Having received the information about the cutoff of communication from the communication application 311, the application communication management/control section 35 determines that communication has been cut off (step C51), and deletes the AP-ID corresponding to the informed AP-ID from the communicating application memory 32 (step C58).

After deleting the corresponding AP-ID from the communicating application memory 32, the application communication management/control section 35 informs the timer determining section 36 that a switch has been made in communication. After that, the operation proceeds to the aforementioned step C53, and the process of steps C53 to C57 is performed.

In the case where the application communication management/control section 35 deletes all the AP-IDs of applications that have been in communication from the communicating application memory 32 at step C58, only the AP-ID "0" given as a default value remains behind. Thus, when there is no application being in communication, the communication control section 39 carries out the transmitting operation using the normal IFS value and random back off time range.

As is described above, according to the second embodiment of the present invention, the timer value memory 34 stores the IFS timer value and the random back off time range used when transmitting he PS-Poll. Consequently, priorities can be set according to applications being in communication. Thus, in the communication that requires real-time processing such as voice communication, the effects of delays can be reduced.

Although in the aforementioned embodiment, the parameter memory 33 stores three levels of priorities, the levels of priorities are not limited in number. Even when the number of priority levels is increased, the radio terminal and the radio communication system of the present invention operate in the same manner as previously described.

Figure 6:
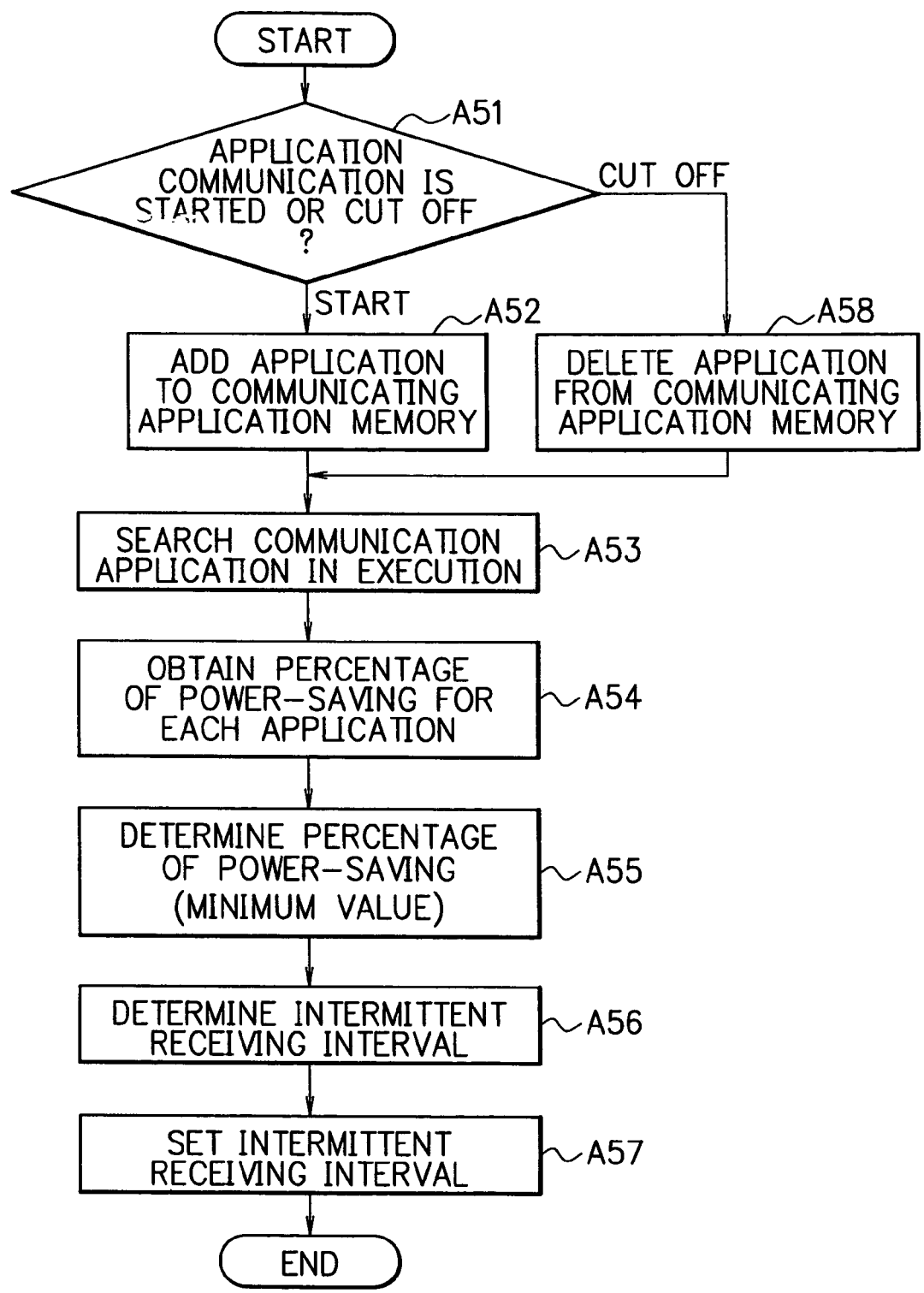
FIG. 6 is a flowchart for explaining the operation of the radio communication system according to the first embodiment of the present invention.

In addition, the second embodiment may be combined with the first embodiment described hereinbefore in connection with FIGS. 4 to 6. That is, the timer value memory 34 may store the wake-up timer value 341 in addition to the IFS timer value 342 and the random back off time range 343 used for transmitting the PS-Poll. With this construction, the intermittent receiving interval can be changed depending on applications being in communication, and also the effects of delays can be reduced in the communication that requires real-time processing such as voice communication. Thus, it is possible to improve voice quality.

In the following, a description will be made in detail of the third embodiment of the present invention with reference to the drawings.

Figure 9:
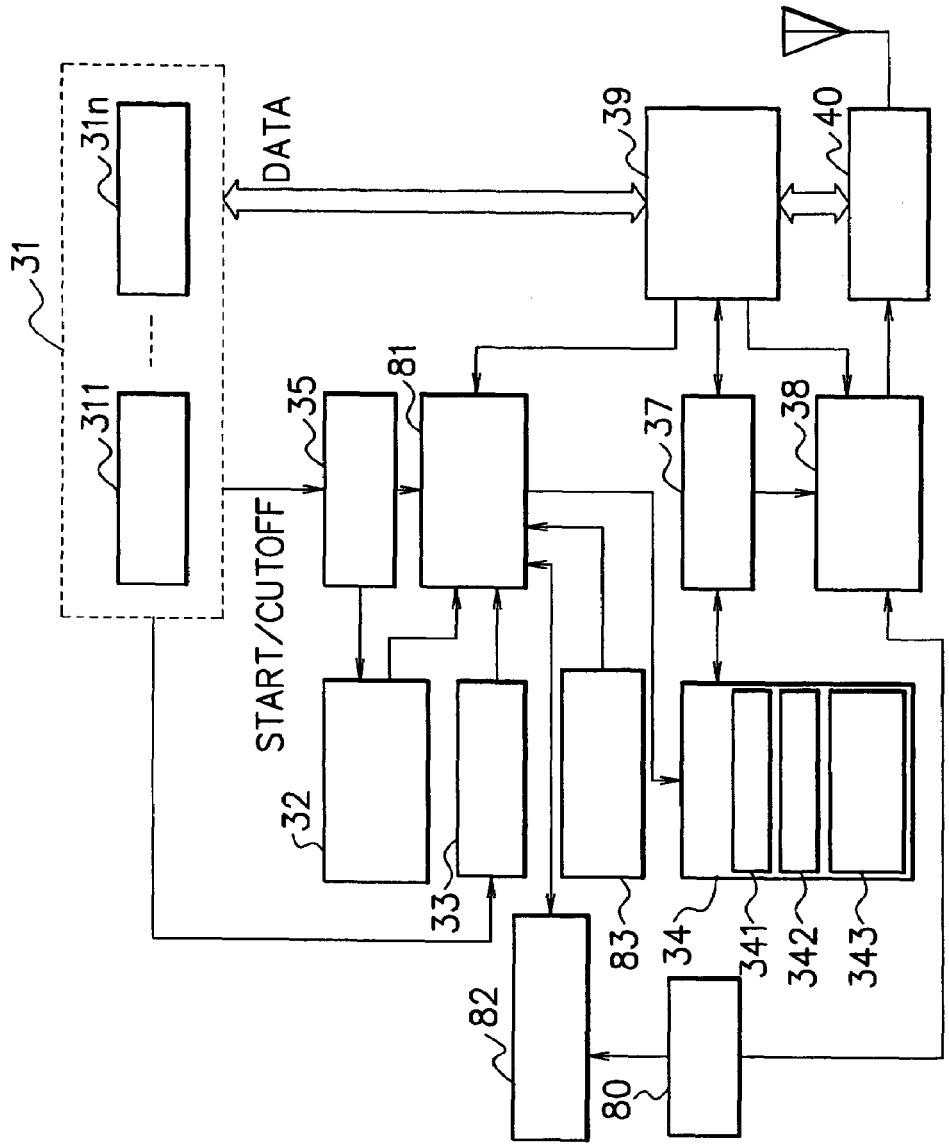
FIG. 9 is a block diagram showing the configuration of a radio terminal according to another embodiment of the present invention.

FIG. 9 is a block diagram showing the configuration of a radio terminal according to the third embodiment of the present invention. Incidentally, the radio terminal shown in FIG. 9 is basically similar to that of FIG. 4, and similar numbers are utilized in designating corresponding portions of the radio terminal. It is believed that the corresponding portions do not require any further explanation.

The radio terminal shown in FIG. 9 differs from that of FIG. 4 in having a battery charge detector 82 and a parameter limit memory 83. Additionally, the radio terminal shown in FIG. 9 is provided with a timer determining section 81 as a substitute for the timer determining section 36. The timer determining section 81 adopts a different determining method than that of the timer determining section 36. Besides, a battery 80 (not shown in FIG. 4) supplies power necessary for the respective portions of the radio terminal.

Upon receipt of a request to detect the remaining battery charge from the timer determining section 81, the battery charge detector 82 measures the remaining amount of charge in the battery 80, and informs the determining section 81 of the remaining amount.

FIG. 10 is a diagram illustrating an example of the contents of the parameter limit memory 83. As can be seen in FIG. 10, the parameter limit memory 83 stores parameter limits 911 and 921 of the power-saving rate and parameter limits 912 and 922 of the priority of communication set according to the proportions of remaining charge in the battery 910 and 920. These parameter limits are stored in the parameter limit memory 83 in advance. The timer determining section 81 fetches the parameter limits from the parameter limit memory 83, and sets the respective timer values stored in the timer value memory 34 according to the remaining amount of battery charge differently from the aforementioned timer determining section 36 in the first and second embodiments.

In the following, a description will be given in detail of the operation of the radio communication system according to the third embodiment of the present invention with reference to FIGS. 9 to 11.

Figure 11:
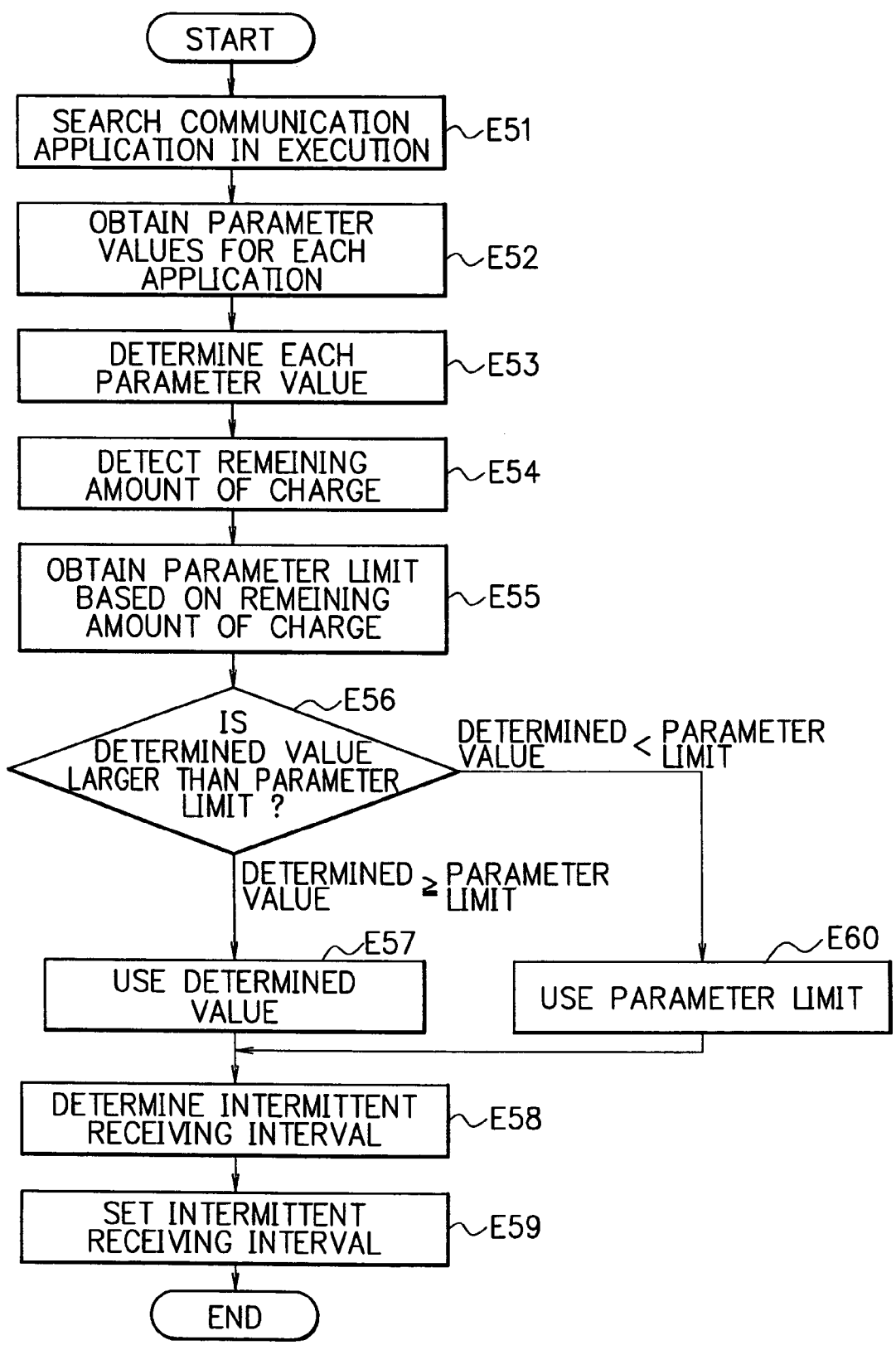
FIG. 11 is a flowchart for explaining the operation of the radio communication system according to the third embodiment of the present invention.

As in the above-mentioned embodiments, the timer determining section 81 searches the communicating application memory 32 for applications currently being in communication (FIG. 11, step E51). Next, the timer determining section 81 searches the parameter memory 33 to obtain respective parameter values with respect to each communication application (step E52), and determines the parameter values for setting the respective timer values to be stored in the timer value memory 34 (step E53).

After that, the timer determining section 81 obtains the proportion of remaining charge in the battery from the battery charge detector 82 (step E54). Subsequently, the timer determining section 81 obtains parameter limits for the power-saving rate and the priority of communication based on the proportion of remaining battery charge with reference to the parameter limit memory 83 (step E55). Then, the timer determining section 81 compares the respective parameter values determined at step E53 with the parameter limits obtained at step E55 (step E56).

Based on the result of the comparison at step E56, the timer determining section 81 determines whether to use the parameter value determined at step E53 (determined value) or the parameter limit obtained at step E55. A choice between the determined value and the parameter limit is made depending on the comparison result. That is, in the case of determining the power-saving rate, the timer determining section 81 compares the power-saving rate determined at step E53 with the parameter limit of the power-saving rate obtained at step E55. If the determined value is equal to or larger than the parameter limit, the timer determining section 81 determines to use the determined value (step E57). When the determined value is smaller than the parameter limit, the parameter limit is to be used (step E60).

On the other hand, in the case of determining the priority, if the priority determined at step E53 is equal to or higher than the parameter limit of priority obtained at step E55, the timer determining section 81 determines to use the determined priority (step E57). When the determined priority is lower than the parameter limit, the parameter limit is to be used (step E60).

Accordingly, when the proportion of remaining battery charge has reduced to less than 20%, the power-saving rate is raised to, at least, a parameter limit of 80% stored in the parameter limit memory 83 as shown in FIG. 10. Thereby, the radio terminal does not conduct the intermittent receiving operation at intervals shorter than the intermittent receiving interval defined by the parameter limit (80%) of the power-saving rate. Thus, it is possible to prolong the life of the battery 80. In addition, an application can be terminated normally by increasing the priority limit to "middle".

According to the third embodiment of the present invention, the radio terminal includes the battery charge detector 82 and the parameter limit memory 83. With this construction, it becomes possible to adjust the power-saving rate so that the radio terminal can be used as long as possible when remaining battery charge has reduced. Moreover, an application can be terminated normally before abruptly interrupted during communication.

Incidentally, the timer determining section 81 may regularly inquire of the battery charge detector 82 about remaining battery charge, and update the respective timer values stored in the timer value memory 34 depending on the remaining battery charge. Besides, the battery charge detector 82 may regularly detect remaining battery charge. In this case, when the battery charge detector 82 detects that the proportion of remaining battery charge changes and goes outside a certain range with reference to the parameter limit memory 83, the detector 82 informs the timer determining section 81 about this. On receipt of the information from the battery charge detector 82, timer determining section 81 updates the respective values stored in the timer value memory 34 if necessary. Thereby, it is possible to respond to a change in remaining battery charge during communication.

As set forth hereinabove, in accordance with the present invention, the intermittent receiving interval can be dynamically changed depending on applications being in communication. Consequently, even when there is any application being in communication, electric power consumption can be reduced as much as possible. As a result, available time of the radio terminal can be prolonged.

Moreover, the intermittent receiving interval with respect to each radio terminal that performs the intermittent receiving operation can be freely changed by the setting on the radio terminal side only regardless of the radio base station. Therefore, in the case where a plurality of radio terminals are connected to one radio base station, the respective radio terminals can perform the intermittent receiving operation at different intermittent receiving intervals. Thus, each radio terminal can change its intermittent receiving interval without being affected by other radio terminals connected to the same radio base station.

Further, there is no need for any special radio base station since the intermittent receiving interval with respect to each radio terminal that performs the intermittent receiving operation can be freely changed by the setting on the radio terminal side only regardless of the radio base station. Consequently, many existing radio base stations are readily available.

Still further, in most cases, the radio terminal of the present invention that performs the intermittent receiving operation can become aware that its packets are buffered in the radio base station sooner as compared to the radio terminal that operates in a normal intermittent receiving mode in synchronism with a beacon with the DTIM. Accordingly, packet delays can be reduced. Thus, it is possible to improve voice quality in the communication that requires real-time processing such as voice communication.

Still further, when remaining battery charge has reduced to less than a certain value, the radio terminal does not conduct the intermittent receiving operation at intervals shorter than the intermittent receiving interval defined by the parameter limit of the power-saving rate. Thus, it becomes possible to control the operation of the radio terminal so as to prolong the battery life as long as possible when remaining battery charge has reduced. In addition, an application can be terminated normally by increasing the priority before abruptly interrupted during communication. Besides, it is possible to reduce wait time since packets can be transmitted preferentially, which reduces electric power consumption.

While the present invention has been described with reference to the particular illustrative embodiments, it is not to be restricted by the embodiments but only by the appended claims. It is to be appreciated that those skilled in the art can change or modify the embodiment without departing from the scope and spirit of the present invention.

What is claimed is:

1. A radio terminal which intermittently receives beacons transmitted from a radio base station at regular intervals and beacons each having a delivery traffic indication map transmitted from the radio base station at intervals of certain beacon intervals, in which, having recognized that its packets are buffered in the radio base station by extracting information elements included in a received beacon, the radio terminal sends the radio base station a control packet to request delivery of the packets, thereby receiving the packets buffered in the radio base station, including:

a timer value changing section for dynamically changing one or more timer values according to the operation mode of each of a plurality of communication applications running on the radio terminal, the operation mode of each of the plurality of communication applications corresponding to at least one of the power-saving rate of the communication application, the priority of the communication application, and a remaining amount of charge in a battery that supplies power necessary for the operation of the radio terminal, the priority of the communication application being established relative to the priorities of the remainder of the plurality of the communication applications, one of the timer values being a random back off time range, defining a range of random wait time that must pass after the channel goes into the idle state until transmission of the packets buffered in the radio base station, the random back off time range being determined based on the priority of the communication application.

2. The radio terminal claimed in claim 1, wherein the timer value is an interval selected from divisors of the interval between the beacons each having the delivery traffic indication map within the range of the regular interval between beacons to the interval between beacons each including the delivery traffic indication map.

3. The radio terminal claimed in claim 2, further comprising:

a battery charge detector for detecting the remaining amount of charge in the battery;

a parameter limit memory for storing parameter limits set according to the proportions of remaining battery charge in advance; and a comparator that fetches the parameter limits from the parameter limit memory based on the remaining amount of battery charge detected by the battery charge detector, compares the respective parameter values determined by the computing section with the parameter limits obtained from the parameter limit memory, and based on the result of the comparison, selects the determined parameter value or the parameter limit, and wherein:

the setting section sets the timer value obtained based on the value selected by the comparator.

4. The radio terminal claimed in claim 3, wherein the comparator selects the determined parameter value when the determined parameter value is equal to or larger than the parameter limit, and selects the parameter limit when the determined parameter value is smaller than the parameter limit.

5. The radio terminal claimed in claim 4, the parameter limit value stored in the parameter limit memory is set based on remaining battery charge, and when remaining battery charge has reduced to less than a certain value, the intermittent receiving interval becomes longer than that when remaining battery charge is more than the certain value.

6. The radio terminal claimed in claim 4, the parameter limit value stored in the parameter limit memory is set based on remaining battery charge, and when remaining battery charge has reduced to less than a certain value, the inter frame space (IFS) timer value becomes larger and the random back off time range becomes narrower than those when remaining battery charge is more than the certain value.

7. A radio communication system using one or more of the radio terminal claimed in claim 3, comprising:

a radio base station which transmits beacons at regular intervals and beacons each having a delivery traffic indication map at intervals of certain beacon intervals, and once buffers packets to the one or more radio terminals operating in power-save mode after the completion of negotiations in a memory.

8. A radio communication system using one or more of the radio terminal claimed in claim 2, comprising:

a radio base station which transmits beacons at regular intervals and beacons each having a delivery traffic indication map at intervals of certain beacon intervals, and once buffers packets to the one or more radio terminals operating in power-save mode after the completion of negotiations in a memory.

9. The radio terminal claimed in claim 1, wherein:

an inter frame space (IFS) timer value which forms a basis for detecting a change of a channel from the busy state to the idle state at the time of transmission is used as another timer value; and the IFS timer value and the random back off time range are changed according to the start of the operation of the communication application.

10. The radio terminal claimed in claim 9, further comprising:

a battery charge detector for detecting the remaining amount of charge in the battery;

a parameter limit memory for storing parameter limits set according to the proportions of remaining battery charge in advance; and a comparator that fetches the parameter limits from the parameter limit memory based on the remaining amount of battery charge detected by the battery charge detector, compares the respective parameter values determined by the computing section with the parameter limits obtained from the parameter limit memory, and based on the result of the comparison, selects the determined parameter value or the parameter limit, and wherein:

the setting section sets the timer value obtained based on the value selected by the comparator.

11. The radio terminal claimed in claim 10, wherein the comparator selects the determined parameter value when the determined parameter value is equal to or larger than the parameter limit, and selects the parameter limit when the determined parameter value is smaller than the parameter limit.

12. The radio terminal claimed in claim 11, the parameter limit value stored in the parameter limit memory is set based on remaining battery charge, and when remaining battery charge has reduced to less than a certain value, the intermittent receiving interval becomes longer than that when remaining battery charge is more than the certain value 13. The radio terminal claimed in claim 11, the parameter limit value stored in the parameter limit memory is set based on remaining battery charge, and when remaining battery charge has reduced to less than a certain value, the inter frame space (IFS) timer value becomes larger and the random back off time range becomes narrower than those when remaining battery charge is more than the certain value.

14. A radio communication system using one or more of the radio terminal claimed in claim 9, comprising:

a radio base station which transmits beacons at regular intervals and beacons each having a delivery traffic indication map at intervals of certain beacon intervals, and once buffers packets to the one or more radio terminals operating in power-save mode after the completion of negotiations in a memory.

15. A radio communication system using one or more of the radio terminal claimed in claim 1, comprising:

a radio base station which transmits beacons at regular intervals and beacons each having a delivery traffic indication map at intervals of certain beacon intervals, and once buffers packets to the one or more radio terminals operating in power-save mode after the completion of negotiations in a memory.

16. A radio terminal which intermittently receives beacons transmitted from a radio base station at regular intervals and beacons each having a delivery traffic indication map transmitted from the radio base station at intervals of certain beacon intervals, in which, having recognized that its packets are buffered in the radio base station by extracting information elements included in a received beacon, the radio terminal sends the radio base station a control packet to request delivery of the packets, thereby receiving the packets buffered in the radio base station, comprising:

a plurality of communication applications, one or more parameters being set individually for each of them;

a computing section for carrying out aggregative computations to obtain timer values based on the parameters set for two or more communication applications in execution among the plural communication applications; and a setting section for setting the timer values obtained by the computing section.

17. The radio terminal claimed in claim 16, wherein the timer value is an interval selected from divisors of the interval between the beacons each having the delivery traffic indication map within the range of the regular interval between beacons to the interval between beacons each including the delivery traffic indication map.

18. The radio terminal claimed in claim 17, further comprising:

a battery charge detector for detecting the remaining amount of charge in a battery that supplies power necessary for the operation of the radio terminal;

a parameter limit memory for storing parameter limits set according to the proportions of remaining battery charge in advance; and a comparator that fetches the parameter limits from the parameter limit memory based on the remaining amount of battery charge detected by the battery charge detector, compares the respective parameter values determined by the computing section with the parameter limits obtained from the parameter limit memory, and based on the result of the comparison, selects the determined parameter value or the parameter limit, and wherein:

the setting section sets the timer value obtained based on the value selected by the comparator.

19. The radio terminal claimed in claim 18, wherein the comparator selects the determined parameter value when the determined parameter value is equal to or larger than the parameter limit, and selects the parameter limit when the determined parameter value is smaller than the parameter limit.

20. The radio terminal claimed in claim 19, the parameter limit value stored in the parameter limit memory is set based on remaining battery charge, and when remaining battery charge has reduced to less than a certain value, the intermittent receiving interval becomes longer than that when remaining battery charge is more than the certain value.

21. The radio terminal claimed in claim 19, the parameter limit value stored in the parameter limit memory is set based on remaining battery charge, and when remaining battery charge has reduced to less than a certain value, the inter frame space (IFS) timer value becomes larger and the random back off time range becomes narrower than those when remaining battery charge is more than the certain value.

22. A radio communication system using one or more of the radio terminal claimed in claim 17, comprising:
a radio base station which transmits beacons at regular intervals and beacons each having a delivery traffic indication map at intervals of certain beacon intervals, and once buffers packets to the one or more radio terminals operating in power-save mode after the completion of negotiations in a memory.

23. The radio terminal claimed in claim 16, wherein:
an inter frame space (IFS) timer value which forms a basis for detecting a change of a channel from the busy state to the idle state at the time of transmission and a random back off time range which is the range of standby time to wait a random period of time before transmission from when the channel goes into the idle state are used as the timer values; and the IFS timer value and the random back off time range are changed according to the start of the operation of the communication application.

24. The radio terminal claimed in claim 23, further comprising:
a battery charge detector for detecting the remaining amount of charge in a battery that supplies power necessary for the operation of the radio terminal;
a parameter limit memory for storing parameter limits set according to the proportions of remaining battery charge in advance; and
a comparator that fetches the parameter limits from the parameter limit memory based on the remaining amount of battery charge detected by the battery charge detector, compares the respective parameter values determined by the computing section with the parameter limits obtained from the parameter limit memory, and based on the result of the comparison, selects the determined parameter value or the parameter limit, and wherein:
the setting section sets the timer value obtained based on the value selected by the comparator.

25. The radio terminal claimed in claim 24, wherein the comparator selects the determined parameter value when the determined parameter value is equal to or larger than the parameter limit, and selects the parameter limit when the determined parameter value is smaller than the parameter limit.

26. The radio terminal claimed in claim 25, the parameter limit value stored in the parameter limit memory is set based on remaining battery charge, and when remaining battery charge has reduced to less than a certain value, the intermittent receiving interval becomes longer than that when remaining battery charge is more than the certain value.

27. The radio terminal claimed in claim 25, the parameter limit value stored in the parameter limit memory is set based on remaining battery charge, and when remaining battery charge has reduced to less than a certain value, the inter frame space (IFS) timer value becomes larger and the random back off time range becomes narrower than those when remaining battery charge is more than the certain value.

28. A radio communication system using one or more of the radio terminal claimed in claim 23, comprising:
a radio base station which transmits beacons at regular intervals and beacons each having a delivery traffic indication map at intervals of certain beacon intervals, and once buffers packets to the one or more radio terminals operating in power-save mode after the completion of negotiations in a memory.

29. The radio terminal claimed in claim 16, wherein the computing section outputs the minimum value of the respective parameters set for two or more communication applications in execution, and the timer value is obtained based on the minimum value.

30. The radio terminal claimed in claim 29, further comprising:
a battery charge detector for detecting the remaining amount of charge in a battery that supplies power necessary for the operation of the radio terminal;
a parameter limit memory for storing parameter limits set according to the proportions of remaining battery charge in advance; and
a comparator that fetches the parameter limits from the parameter limit memory based on the remaining amount of battery charge detected by the battery charge detector, compares the respective parameter values determined by the computing section with the parameter limits obtained from the parameter limit memory, and based on the result of the comparison, selects the determined parameter value or the parameter limit, and wherein:
the setting section sets the timer value obtained based on the value selected by the comparator.

31. The radio terminal claimed in claim 30, wherein the comparator selects the determined parameter value when the determined parameter value is equal to or larger than the parameter limit, and selects the parameter limit when the determined parameter value is smaller than the parameter limit 32. The radio terminal claimed in claim 31, the parameter limit value stored in the parameter limit memory is set based on remaining battery charge, and when remaining battery charge has reduced to less than a certain value, the intermittent receiving interval becomes longer than that when remaining battery charge is more than the certain value.

33. The radio terminal claimed in claim 31, the parameter limit value stored in the parameter limit memory is set based on remaining battery charge, and when remaining battery charge has reduced to less than a certain value, the inter frame space (IFS) timer value becomes larger and the random back off time range becomes narrower than those when remaining battery charge is more than the certain value.

34. A radio communication system using one or more of the radio terminal claimed in claim 29, comprising:
    a radio base station which transmits beacons at regular intervals and beacons each having a delivery traffic indication map at intervals of certain beacon intervals, and once buffers packets to the one or more radio terminals operating in power-save mode after the completion of negotiations in a memory.

35. The radio terminal claimed in claim 16, further comprising:
    a battery charge detector for detecting the remaining amount of charge in a battery that supplies power necessary for the operation of the radio terminal;
    a parameter limit memory for storing parameter limits set according to the proportions of remaining battery charge in advance; and
    a comparator that fetches the parameter limits from the parameter limit memory based on the remaining amount of battery charge detected by the battery charge detector, compares the respective parameter values determined by the computing section with the parameter limits obtained from the parameter limit memory, and based on the result of the comparison, selects the determined parameter value or the parameter limit, and wherein:
    the setting section sets the timer value obtained based on the value selected by the comparator.

36. The radio terminal claimed in claim 35, wherein the comparator selects the determined parameter value when the determined parameter value is equal to or larger than the parameter limit, and selects the parameter limit when the determined parameter value is smaller than the parameter limit.

37. The radio terminal claimed in claim 36, the parameter limit value stored in the parameter limit memory is set based on remaining battery charge, and when remaining battery charge has reduced to less than a certain value, the intermittent receiving interval becomes longer than that when remaining battery charge is more than the certain value.

38. The radio terminal claimed in claim 36, the parameter limit value stored in the parameter limit memory is set based on remaining battery charge, and when remaining battery charge has reduced to less than a certain value, the inter frame space (IFS) timer value becomes larger and the random back off time range becomes narrower than those when remaining battery charge is more than the certain value.

39. A radio communication system using one or more of the radio terminal claimed in claim 35, comprising:
    a radio base station which transmits beacons at regular intervals and beacons each having a delivery traffic indication map at intervals of certain beacon intervals, and once buffers packets to the one or more radio terminals operating in power-save mode after the completion of negotiations in a memory.

40. A radio communication system using one or more of the radio terminal claimed in claim 16, comprising:
    a radio base station which transmits beacons at regular intervals and beacons each having a delivery traffic indication map at intervals of certain beacon intervals, and once buffers packets to the one or more radio terminals operating in power-save mode after the completion of negotiations in a memory.

* * * * *